Figure 1:
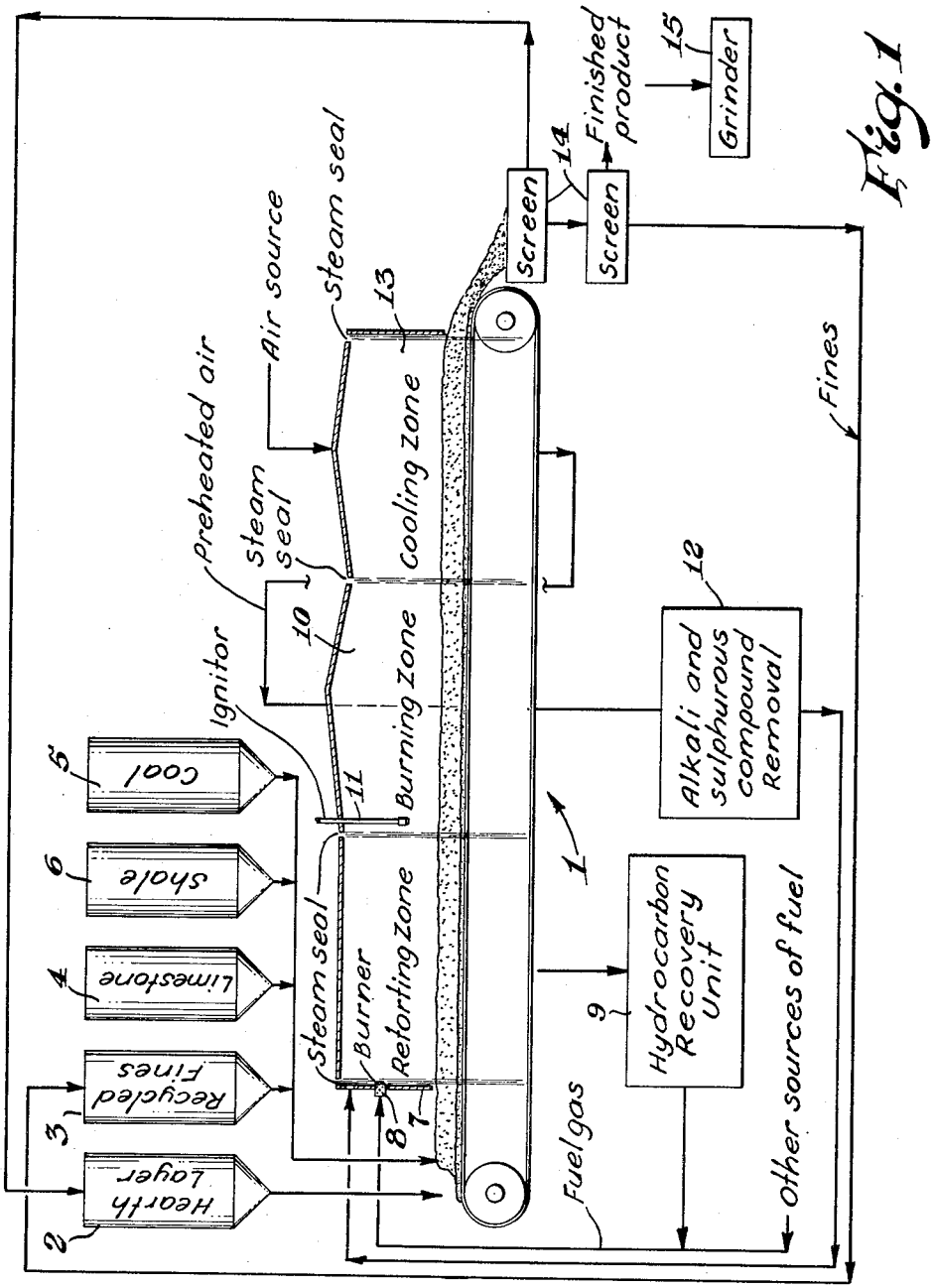

July 17, 1962 J. J. GREBE ET AL 3,044,756
PRODUCTION OF CEMENT
Filed Feb. 10, 1960 2 Sheets-Sheet 1

INVENTORS.
John J. Grebe
John F. Miller
BY
ATTORNEY

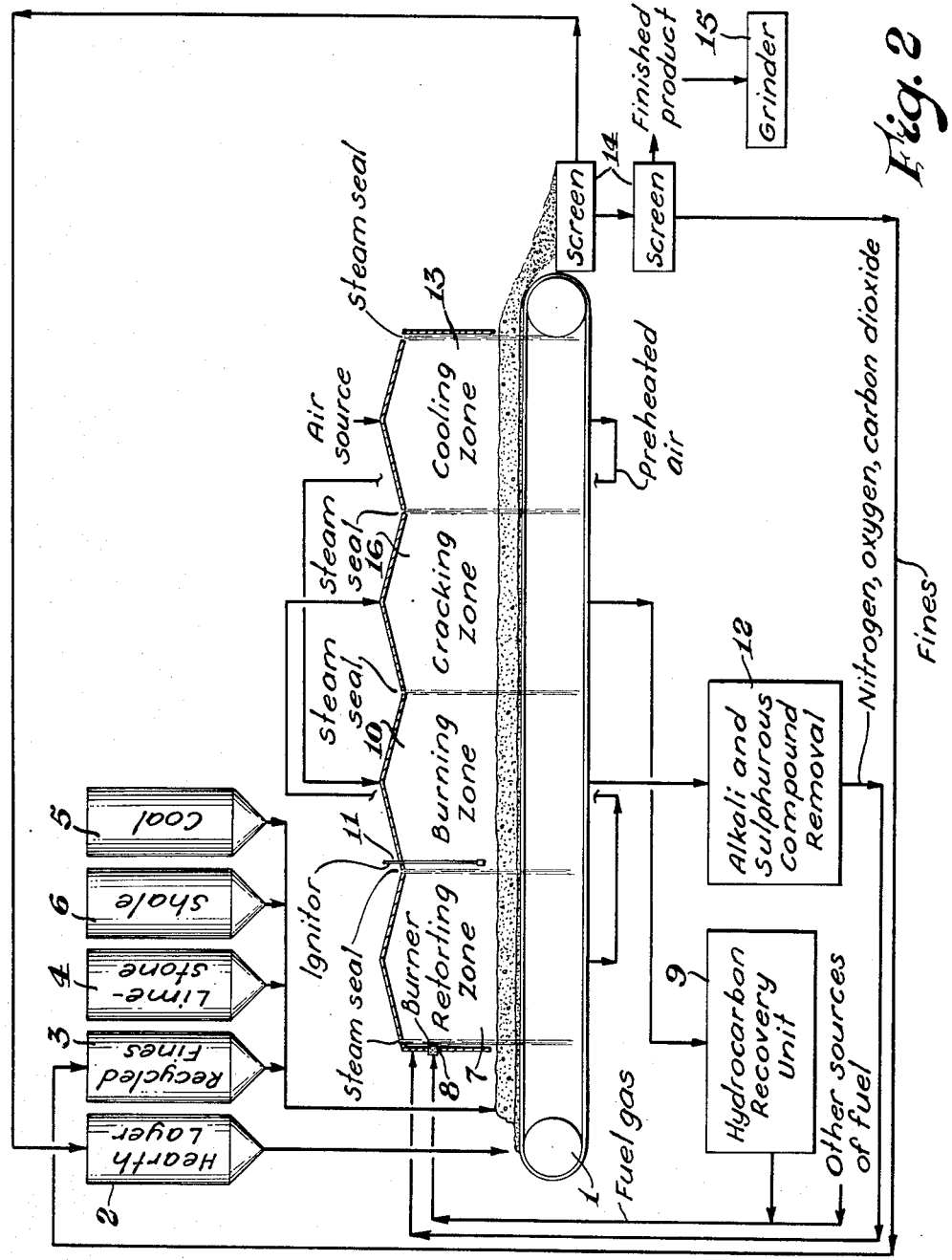

United States Patent Office 3,044,756
Patented July 17, 1962

3,044,756
PRODUCTION OF CEMENT
John J. Grebe and John F. Miller, Midland, Mich., assignors to The Dow Chemical Company, Midland, Mich., a corporation of Delaware
Filed Feb. 10, 1960, Ser. No. 7,786
2 Claims. (Cl. 263—53)

This invention relates to the production of cement, and more particularly, to a method of removing volatile, water-soluble alkali, sulfurous compounds and hydrocarbons from the cement producing constituents before the production of cement clinker.

Presently, cement is being produced on a wide variety of heating devices such as rotary kilns, traveling chain grates and combinations thereof. In each method, detrimental amounts of volatile, water-soluble alkali, sulfurous compounds and hydrocarbons are volatilized during the heating process and thereafter condensed on cooler portions of the processing devices in a manner that the volatile, water-soluble components are either returned to the production stream and retained in the final cement product or unused and lost as flue gases. Such volatile, water-soluble compounds, as envisioned herein, include the sodium, potassium and ammonium sulfide, oxides, carbonates, chlorides and hydroxides whose presence is undesirable in standard commercial cement. Also valuable hydrocarbons such as methane, ethane, benzene, xylene and like coal and shale chemicals are usually irretrievably lost in the surrounding atmosphere, or burned at low fuel cost values, instead of being recovered and thereafter utilized as liquid fuels or chemical raw materials.

It is, therefore, a principal object of this invention to provide a process for the removal of volatile, water-soluble alkali, chlorides, sulfurous compounds and hydrocarbons before formation of finally produced cement clinker. A further object is to remove said volatile, water-soluble components by an economical method which neither contaminates the cement clinker nor makes it unsuitable for pulverizing and subsequent use. Other objects will become apparent hereinafter.

The above objects may be accomplished by treating the cement producing constituents, consisting essentially of carbonaceous, calcareous, and argillaceous materials, in the manner hereinafter described with segregated non-oxidizing and oxidizing gas flows at temperatures varying from about 750° F. to about 350° F.

The term "non-oxidizing gas," as used herein, means any substance, gaseous at the temperatures required herein, which will not cause appreciable chemical oxidation to occur with the cement producing constituents under the conditions of cement production hereinafter described. Particularly, such non-oxidizing gases will include carbon monoxide, carbon dioxide, carbon suboxides, nitrogen, hydrogen, hydrocarbons, chlor-hydrocarbons and combinations thereof.

The term "oxidizing gas," as used herein, means any substance, gaseous at the temperatures required herein, which will serve to sustain or promote combustion. Specifically, suitable gases include air, nitrogen oxides and oxygen.

While it is known that water-soluble alkali, chlorides and sulfurous compounds are undesirable in the presence of cement and further that many of such water-soluble alkali chlorides and sulfurous compounds are volatile at temperatures between about 1000° F. and about 2500° F., it is novel to demonstrate a means whereby such compounds may be simultaneously volatilized, removed from the cement burning zone, and thereafter recovered by means of water-scrubbers, precipitation baths, electrostatic precipitators and the like. In a like manner, volatile hydrocarbons and/or chlor-hydrocarbons may be volatilized, removed from the cement retorting or cracking zone, and thereafter recovered, in whole or in part, by similar scrubbing and precipitation methods. Thus, it is now possible to provide an exceptionally high grade of cement clinker while concomitantly recovering valuable waste-products that were heretofore incapable of being technically and economically utilized.

Referring to the drawings, which describe in more detail the mode of operation for producing cement clinker as well as the types of equipment which are desirable in this instance:

FIGURE 1 is a schematic diagram of equipment and apparatus necessary for preparing cement clinker as well as the concomitant removal and/or recovery of volatile, water-soluble alkali, sulfurous compounds and hydrocarbons.

FIGURE 2, likewise, is a schematic diagram of equipment and apparatus usable for preparing cement clinker as well as the concomitant removal and/or recovery of volatile, water-soluble alkali and sulfurous compounds with the hydrocarbon recovery system embodied in a fractional cracking zone.

In FIGURE 1, a continuously traveling grate 1 is initially loaded with a hearth layer 2, composed primarily of oversized, recycled cement-clinker, as support for recycled cement-clinker fines 3, limestone 4, coal 5 and shale 6. The loaded grate consisting of the hearth layer and cement producing constituents, is then allowed to proceed into the steam-sealed retorting zone 7 containing sufficient heat and non-oxidizing atmosphere, which may or may not be produced with a burner 8, that the volatile hydrocarbons in the coal and shale may be removed from the retorting zone 7 and passed to a suitable hydrocarbon volatile recovery unit 9. If desired, portions of the volatile hydrocarbons may be recycled back to the retorting zone 7 as a means for providing both heat and non-oxidizing atmosphere.

Following the hydrocarbon removal, the grate is allowed to travel, while carrying the cement-producing constituents, into the burning zone 10, desirably sealed with steam seals or the like, wherein the cement-producing constituents are ignited by means of an open flame torch or the like 11 in the presence of preheated oxidizing gas from the cooling zone in such a manner that initial ignition occurs windward to the oxidizing gas flow. As ignition proceeds, high temperatures are achieved whereby deleterious alkali, chlorides and sulfurous compounds are volatilized and carried away from the burning zone 10 by means of the oxidizing gas into a suitable alkali and sulfurous compound removal system 12. Thereafter, the carrying gas, having the volatile alkali, chlorides and sulfurous compounds removed and composed primarily of nitrogen oxide and carbon dioxide, may optionally be passed into the retorting zone 7 to serve as the non-oxidizing gas after sufficient reduction in the burner 8. The retorting zone 7 as contemplated herein, may be composed of a series of separate retorting chambers, segregated by means of suitable seals, such as steam seals, whereby the processes discussed herein may be carried out in one or more of said retorting chambers, depending upon the particular result desired.

When the burning and volatile removal are essentially completed, the products, which may be on the traveling grate 1 are then passed into the cooling zone 13 wherein the cement-clinker, formed by the aforementioned burning, is cooled by means of a large volume of air flow that passes to the burning zone 10. After the cement-clinker is sufficiently cooled, it is broken and passed to a series of screens 14 for segregation of the hearth layer, finished product, and fines. The finished product is thereafter introduced into a grinder 15 for pulverization into commercial cement.

In FIGURE 2, the same process, as that heretofore diagramed and enumerated in FIGURE 1 hereof, is contemplated except that a cracking zone 16 enclosed by means of suitable steam seals or the like, has been introduced for the purpose of providing a heated zone which may or may not be composed of a series of segregated cracking chambers, whereby the volatile hydrocarbons from the retorting zone may be fractionally cracked into useful products. This particular embodiment is especially desirable from the standpoint of heat utilization.

To obtain the removal of volatile, water-soluble alkali, chlorides, sulfurous compounds and hydrocarbons, it is necessary to allow the cement producing constituents, consisting essentially of carbonaceous, calcareous and argillaceous materials, to be heated to a temperature from about 700° F. to 1200° F. in the retorting zone, and from about 2500° F. to about 3000° F. in the burning zone. The time necessary in each zone will vary from nearly instantaneous to about thirty minutes depending upon the amounts of materials treated, pressures, and other similar variables affecting high temperature operations. Generally, one to five minutes are sufficient. Concomitant with all or a portion of said heating either a non-oxidizing or oxidizing gas is forced by means of blowers or drawn by means of pressure differential through the cement producing constituents at a rate sufficient to carry the deleterious volatile, water-soluble alkali or sulfurous compounds and valuable hydrocarbons from the various heat zones. This rate of gas flow, by weight, in relation to the weight of the cement producing constituents, will vary to a large degree by the amounts of volatiles to be carried, but generally it should be no more than about 5:1 and preferably no more than about 3:1.

The cement producing constituents should be either placed in or on the heating devices as discrete particles or agglomerates. This may be accomplished by preliminary grinding and sintering, thereby producing an agglomerate, or by pelletizing techniques to form balls or pellets. The operational size of said particles is relatively unimportant since the temperature envisioned is sufficiently high enough to produce volatilization under most adverse conditions. However, the particle size is preferably between about 200 mesh and ⅝". Should the particle size not fall within these limits, changes in the amount of heat employed should be regulated to provide optimum results.

Rotary kilns, traveling chain grates, fluidized beds, concurrent cyclone equipment or combinations thereof are adaptable to this process, but particularly, the traveling chain grate is desirable.

The preferred embodiment of this invention disclosed in FIGURES 1 and 2 hereof utilizes the traveling chain grate aspect, which includes placing the cement producing constituents, consisting of carbonaceous, calcareous and argillaceous materials, upon the flat chain grate in the form of a presintered agglomerate, unheated pellets, or both and, thereafter subjecting the cement producing constituents to a temperature varying from about 1000° F. to about 3500° F. while in the presence of either non-oxidizing gas having a flow rate of about 5 to 1 weight ratio. Further, if sufficient carbonaceous material is utilized to either sustain or enhance combustion in the burning zone, the flame front may be commenced at the windward side of the gas flow and thereafter forced through the cement producing constituents by means of the high volume of carrying gas passing through the bed. This in situ burning technique is particularly desirable to effectively utilize existing potential heat energy contained in the carbonaceous materials. As a means for further preserving heat, the hot carrying gases emerging from the bed, containing volatile, water-soluble alkali, chlorides or sulfurous compounds, may be passed through the separating column, scrubber, or precipitator and thereafter recycled back through the retorting zone to supply the needed non-oxidizing atmosphere.

The virtues of the foregoing specific embodiment are readily apparent since the volatile removal and recovery may be readily accomplished on the traveling grate during cement sintering without lost motion or excessive material handling.

We claim:

1. The process for preparing cement clinker which comprises: (1) placing upon a continuous traveling grate cement producing constituents consisting of carbonaceous, calcareous and argillaceous materials containing volatile water-soluble alkali chlorides and sulfurous compounds; (2) moving into a retoring zone and subjecting therein said cement producing constituents to initial heating from about 700° F. to about 1200° F. in the presence of a non-oxidizing gas flow, thereby effecting removal of volatile hydrocarbons therefrom; (3) then, moving into a burning zone and finally heating therein said cement producing constituents from about 2500° F. to 3500° F. in the presence of an oxidizing gas flow, thereby effecting removal of volatilizable water-soluble alkali chlorides and sulfurous compounds therefrom; and, thereafter (4) moving into a cooling zone and cooling therein said cement producing constituents.

2. The process for preparing cement clinker which comprises: (1) placing upon a continuous traveling grate cement producing constituents consisting of carbonaceous, calcareous and argillaceous materials containing volatile water-soluble alkali chlorides and sulfurous compounds; (2) moving into a retorting zone and subjecting therein said cement producing constitutents to initial heating from about 700° F. to about 1200° F. in the presence of a non-oxidizing gas flow, wherein the amount of non-oxidizing gas flow, by weight, exceeds no more than about five times the weight of said cement producing constituents, thereby effecting removal of volatile hydrocarbons therefrom; (3) then, moving to a burning zone and finally heating therein said cement producing constituent from about 2500° F. to 3500° F. in the presence of an oxidizing gas flow, wherein the amount of said oxidizing gas flow, by weight, exceeds no more than above five times the weight of said cement producing constituents, thereby effecting removal of volatilizable water-soluble alkali chlorides and sulfurous compounds therefrom; and, thereafter (4) moving into a cooling zone and cooling therein said cement producing constituents.

References Cited in the file of this patent

UNITED STATES PATENTS

| 1,366,479 | Newberry | Jan. 25, 1921 |
| 2,090,363 | Wendeborn | Aug. 17, 1937 |
| 2,164,247 | Knudsen | June 27, 1939 |
| 2,945,688 | Pajenkamp et al. | July 19, 1959 |

FOREIGN PATENTS

| 764,537 | Great Britain | Dec. 28, 1956 |